Patented June 10, 1947

2,421,876

UNITED STATES PATENT OFFICE 2,421,876

COPOLYMER OF STYRENE AND A POLYESTER OF ENDOMETHYLENE TETRAHYDROPHTHALIC ACID AND A GLYCOL

Howard L. Gerhart, Milwaukee, Wis., assignor to Pittsburgh Plate Glass Company, Allegheny County, Pa., a corporation of Pennsylvania No Drawing. Application December 3, 1943, Serial No. 512,767

4 Claims. (Cl. 260—42)

The present invention relates to synthetic resin compositions and it has particular relation to the plasticization of resins comprising the polymerization products of polymerizable olefinic compounds embracing styrene, vinylic compounds, acrylic acid and its esters and other compounds containing reactive olefinic groups.

One object of the invention is to provide olefin polymer resins which are very hard, tough, resistant to solvents and resistant to softening by heat.

A second object is to provide a mixture which will undergo conjoint polymerization of a comparatively rapid rate.

Resins have, therefore, been prepared by the polymerization through the addition reaction of reactive unsaturated groups in olefinic compounds. Styrene is a specific example of such compounds. However, others including vinyl acetate, vinyl chloride, acrylic acid, methacrylic acid and esters (e. g., methyl and ethyl esters) of acrylic acid and methacrylic acid can be polymerized in a similar manner.

The styrene polymer is inherently brittle and is, also, subject to thermal softening at fairly low temperatures. It has, heretofore, been proposed to improve these properties by incorporating inert or non-reactive plasticizers such as dimethyl phthalate therein. In some instances, the product is thus improved, but still it is not entirely satisfactory.

In accordance with the provisions of the present invention, it is proposed to plasticize addendum resins and such as those resulting from the polymerization of styrene, with a reactive plasticizer such as the dihydroxy alcohol esters of tetrahydrophthalic acid or the homologues of tetrahydrophthalic acid.

The tetrahydrophthalic acid and the homologues thereof contemplated herein are easily prepared by subjecting maleic acid anhydride or its homologues to a Diels-Alder type reaction with a conjugate diolefin such as butadiene, cyclopentadiene, or cyclohexadiene. The formula of the anhydride of tetrahydrophthalic acid from maleic acid anhydride and butadiene is written

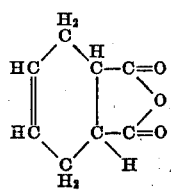

and that of endomethylene tetrahydrophthalic acid from maleic anhydride and cyclopentadiene is written

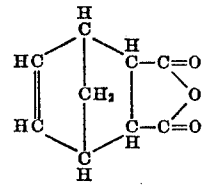

The reaction is discussed in greater detail in copending application Ser. No. 470,028, filed December 24, 1942, and entitled, Preparation of tetrahydrophthalic anhydrides, Howard L. Gerhart and Leon M. Adams, inventors.

In the present application, the term "acid" is to be construed not only as including the free acids, but, also, the anhydrides of cis $\alpha,\beta$-unsaturated, $\alpha,\beta$-dicarboxylic acids, which interchangeably can undergo esterification with dihydroxy alcohols to form the esters contemplated herein. Chloromaleic acid anhydride can also be employed.

The acids or anhydrides will react with dihydroxy alcohols such as glycol, diethylene glycol, triethylene glycol, trimethylene glycol, or tetraethyene glycol or the like to form ester chains such as:

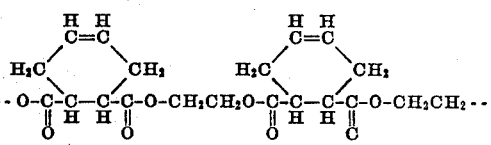

from tetrahydrophthalic acid and glycol, or

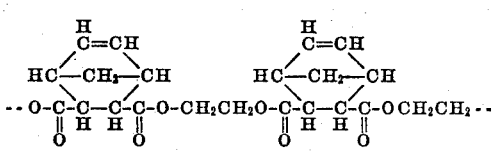

from endomethylene - tetrahydrophthalic acid and glycol.

It is to be observed that the cyclic residues of the acid molecule in the ester linkage each include an olefin linkage or double bond.

The potential reactivity of this double bond is very high even though it is in a cyclic structure and is remote from the carboxyls, so that when the polyester is heated during the last stages of the esterification when the acid number approaches 10, the molecular chains cross link through the double bonds to form a three dimensional polymer which is very insoluble. Likewise a soluble polymer having an acid number of 40 or less will absorb oxygen at the double bonds and be converted to a partially oxidized resin which may easily become insoluble. Thus, it is seen that the double bond will very easily engage in polymerization reactions. Therefore, it is desirable to discontinue esterification before the gel stage is reached. Also, an inert atmosphere should be maintained over the reactants and the resultant ester to prevent polymerization by oxidation.

Esters can be made with many common polyhydroxyl compounds but the esters which are most useful are those having two hydroxyl groups such as ethylene glycol, diethylene glycol, triethylene glycol, trimethylene glycol, etc. A very small amount of glycerine may be used to replace a portion of the glycol in the preparation of these esters. The glycerine tends to make the polyesters less soluble. The most desirable esters are those having an acid value of 40 or less, preferably below about 30 but not so low as to be gelled or partially gelled. These esters are prepared in the presence of an inert gas totally free of oxygen and they may be prepared by a method which involves the use of a solvent to facilitate the removal of the water. The procedure follows the general methods well known in the preparation of the polyester type resins. The following examples are illustrative of such methods:

Example A

A mixture of 164 parts of endomethylene tetrahydrophthalic anhydride and 116 parts diethylene glycol is heated as rapidly as is convenient to 180° C. under air reflux condensation. The temperature is raised gradually to 220° C. while a rapid stream of inert gas is passed through the liquid. The water formed in the esterification process is thus carried out of the reactor as rapidly as it is formed. Heating is continued at 220° C. until the liquid ester has an acid number of 40 or less. The ester is then cooled and stored in an inert atmosphere.

The reaction may also be conducted in a solvent substantially as follows:

Example B

Charge 146 parts tetrahydrophthalic anhydride, 116 parts diethylene glycol, and 20 parts xylol into a container equipped with a side arm take-off. Heat the mixture to boil off the xylol and water rapidly. Separate the water from the xylol and return the xylol to the container substantially as rapidly as it distills. Continue the refluxing until the acid number of the ester is less than 40. Pass a rapid stream of inert gas through the liquid so as to free the finished ester of most of the boiling xylol. Remove last traces of xylol at reduced pressure again in an inert atmosphere.

In the examples, the proportions are by weight.

It has been found that while the esters are plasticizers for styrene resins and similar resins formed by addendum polymerization of polymerizable olefins, they are also reactive with the olefin or its partial polymer and form true reaction products from which the resin cannot be extracted by mere physical methods. Heretofore, the resin prepared from styrene was very brittle in the unplasticized form. It was also a thermoplastic resin which softened when it was heated to 100° C. When this resin, however, is prepared in the presence of an ester of this type, the resin is tough and very strong and does not soften at high temperatures. The ester has not only imparted the property of toughness but by entering into the polymerization (by virtue of the reactive double bonds) has produced an infusible thermoset resin.

The following compositions illustrate the types of mixtures which can be polymerized to resins by this contemplated method:

Example I

| Composition | Conditions | Description of Plastic |
|---|---|---|
| 10 parts Styrene<br>10 parts Diethylene glycol ester of endomethylene tetrahydrophthalic acid<br>0.03 part Benzoyl peroxide | 100° C. for 1 hour | Hard, transparent resin. |

Example II

| Composition | Conditions | Description of Plastic |
|---|---|---|
| 20 parts Styrene<br>8 parts Same ester as in (I)<br>.03 part Benzoyl peroxide | 100° C. for 15 hours | Very hard resin. |

Example III

| Composition | Conditions | Description of Plastic |
|---|---|---|
| 27.5 parts Same ester as in (I)<br>5 parts Styrene<br>.03 part Benzoyl peroxide | 100° C. for 5 hours | Soft and gummy, low tensile strength. |

Example IV

| Composition | Conditions | Description of Plastic |
|---|---|---|
| 18 parts Styrene<br>6 parts Same ester as in (I) | 100° C. for 5 hours | Very hard resin. |

Example V

| Composition | Conditions | Description of Plastic |
|---|---|---|
| 20 parts Styrene<br>5 parts Triethylene glycol ester of endomethylene tetrahydrophthalic anhydride<br>.03 part Benzoyl peroxide | 10 hours @ 60° C | Very hard, clear transparent. |

Example VI

| Composition | Conditions | Description of Plastic |
|---|---|---|
| 20 parts Styrene<br>5 parts Tetraethylene glycol ester of endomethylene tetrahydrophthalic anhydride<br>.03 part Benzoyl peroxide | 10 hours @ 60° C | Excellent hardness and clarity. |

Example VII

| Composition | Conditions | Description of Plastic |
|---|---|---|
| 12 parts Styrene<br>20 parts Diethylene glycol ester of tetrahydrophthalic anhydride | 10 hours @ 60° C | Very hard resin. |

Example VIII

| Composition | Conditions | Description of Plastic |
|---|---|---|
| 35 parts Styrene<br>5 parts Diethylene glycol ester of tetrahydrophthalic acid<br>0.4 part Benzoyl peroxide | 15 hours @ 110° C. | Very hard resin. |

Example IX

| Composition | Conditions | Description of Plastic |
|---|---|---|
| 150 parts Diethylene glycol ester of tetrahydrophthalic acid<br>450 parts Styrene<br>3.4 parts Benzoyl peroxide | 5 hours @ 60° C. | Tough plastic having good impact strength. |

During the mixing operation, rapid agitation is desirable to prevent premature gellation of the resin.

Catalysts such as benzoyl peroxide can be employed but are not essential to the reaction.

In the foregoing examples, styrene may be substituted in whole or in part by other polymerizable olefins such as methyl, methacrylic acid ester, vinyl acetate, and others that similarly polymerize.

The ratio of ester to polymerizable olefin may be varied over a broad range to provide products having properties especially suited for particular conditions. For example, styrene may constitute from 1 to 99 percent of the mixture dependent upon the characteristics desired in the product. A ratio of 50 percent is very satisfactory for most purposes.

The temperature of polymerization can be as low as substantially normal room temperature. Higher temperatures increase the rate of reaction but should be adjusted to obviate undue violence. Also, it should not be so high as to induce decomposition or charring of the reactants of the reaction product.

The preparation of a laminated product from the resin is illustrated by the following example:

Example 10

Two glass plates were coated on one side with bath soap. The soap was rubbed off lightly and the glass plates buffed with a muslin wheel. Four strips of cotton duck cloth were soaked with the above ingredients, e. g., from Example I (which were easily dissolved on the steam bath) and placed between the prepared glass plates. The assembly was placed in an oven at 60° C. for three hours. After cooling, the glass plates were removed. The cloth was laminated by this treatment into a tough board having a very hard surface. Instead of the soap, a thin film of methyl cellulose or polyvinyl alcohol makes a good partitioning agent to facilitate the removal of the glass from the plastic.

Many variations in ratios of the ingredients of the mixture can be made and many heating schedules may be followed with apparent equal success in the preparation of these resins. The following observations illustrate the behavior of this base composition under resin-forming conditions:

1. The ingredients are brought into intimate solution by heating on the steam bath. Rapid agitation is necessary to prevent gellation even though the temperature be kept below 65° C.

2. The intimately mixed composition can be set to a gel or jelly within 5 to 60 minutes by (a) heating to 60° C. or (b) by irradiating in direct sunlight at 30° C.

3. The gelled resin will polymerize rapidly at 60° C. and above to a hard plastic body which generally shrinks from the casting vessel. A convenient heating schedule after complete gellation is one hour at 100° C.

4. At temperatures above 130° C., the hardening process is very rapid. Very hard thin castings have been prepared by heating the gelled resin to 130° C. for 8 minutes.

5. Fibrous materials have been laminated at pressures slightly above atmospheric by heating cloth, paper and Fiberglas soaked with the freshly mixed compositions. The process is ideally suited for laminating at low pressures, since no complicated pressure developing mechanism is necessary. Thus, the sheets may be placed between two glass plates and the assembly heated several hours at 60–100° C. Likewise, the more complicated shapes may be formed within or around a pattern while heat and pressure is applied by inserting them in the well-known "vacuum bag" and subjecting the bag to pressure of a hot inert liquid.

Description of resins

Resins prepared from the above compositions are characterized by extreme surface penetration hardness. When the raw materials are in the highest state of purity, the finished resins may be perfectly transparent. The clarity may vary from hazy translucency to full transparency depending upon the method of polymerization. It is generally observed that resins prepared at a higher temperature such as at 100° C. are more transparent than resins prepared at room temperature.

It will be appreciated that the schedules given are more than sufficient to produce complete polymerization. Usually some additional heating can do no harm. It will also be appreciated that light is a very effective catalyst and that the heating schedule is shortened materially in strong sunlight or irradiation of a similar nature. In general, the esters of tetrahydrophthalic acid react less rapidly than esters of endomethylene tetrahydrophthalic acid. It will also be appreciated that higher proportions of catalyst will hasten the reaction. Inhibitors such as phenothiazine or hydroquinone can likewise be added to the reaction mixture to phlegmatize the action.

In the examples given, a relatively large ratio of styrene is required to produce a plastic piece having the maximum degree of hardness. A relatively large ratio of the ester will impart greater flexibility.

The embodiments of the invention herein shown and described are to be considered merely as being by way of example. It will be apparent to those skilled in the art that numerous modifications may be made therein without departure from the spirit of the invention or the scope of the appended claims.

What I claim is:

1. A method of preparing a hard, resinous copolymer product which comprises heating a mixture composed of 50 to 80% of styrene and 20 to 50% of an ester of endomethylene tetrahydrophthalic acid and a glycol consisting of 2 to 4 ethylene groups between the hydroxyls, the ethylene groups being bridged together by ether-oxygen linkages, the heating operation being effected at a temperature of 60 to 100° C. and in the presence of a peroxide type catalyst and being continued until said hard tough resinous copolymer product is obtained.

2. A method of preparing a hard, tough, resinous copolymer product which comprises heating to a temperature of 60 to 110° C. a mixture consisting of 20 to 50% of polyesters of diethylene glycol and endomethylene tetrahydrophthalic acid and the rest styrene, the heating operation being continued until said product is formed.

3. As a new product a hard resinous body consisting of the copolymer of 50 to 80% of styrene and 20 to 50% of a polyester of endomethylene tetrahydrophthalic acid and a glycol containing 2 to 4 ethylene groups linked together by oxygen-ether linkages.

4. As a new product a hard tough resin body consisting of a copolymer of 50 to 80% of styrene and 20 to 50% of a polyester of endomethylene tetrahydrophthalic acid and diethylene glycol.

HOWARD L. GERHART.

REFERENCES CITED

The following references are of record in the file of this patent:

UNITED STATES PATENTS

| Number | Name | Date |
| --- | --- | --- |
| 1,860,730 | Brooks | May 31, 1942 |
| 2,195,362 | Ellis (1) | Mar. 26, 1940 |
| 2,235,447 | Bradley et al. | Mar. 18, 1941 |
| 2,251,297 | Soday | Aug. 5, 1941 |
| 2,255,313 | Ellis (2) | Sept. 9, 1941 |
| 2,311,260 | Staff | Feb. 16, 1943 |
| 2,319,780 | Pellett | May 25, 1943 |
| 2,319,826 | Pellett (2) | May 25, 1943 |
| 2,359,038 | Hopf (2) | Sept. 26, 1944 |
| 2,351,019 | Gerhart | Oct. 24, 1944 |
| 2,369,689 | Robie | Feb. 20, 1945 |

FOREIGN PATENTS

| Number | Country | Date |
| --- | --- | --- |
| 598,732 | Germany | June 26, 1930 |
| 695,756 | Germany | Aug. 1, 1940 |

OTHER REFERENCES

Hackh's Chemical Dictionary Blakiston 1937, (2nd ed.), page 652, article "olefine." (Copy in Division 50.)

Kropa Ind. & Eng. Chem., Dec. 1939, pp. 1512 to 1516. (Copy in Scien. Libr. 260–42.)

Mattiello, Protective & Decorative Coatings, 1941, Vol. I, pages 423 to 425. (Copy in Div. 50.)